E. H. JOHNSON.
EGG BEATER.
APPLICATION FILED SEPT. 25, 1915.

1,250,889.

Patented Dec. 18, 1917.
2 SHEETS—SHEET 1.

Inventor
E. H. Johnson,

Witnesses

By
Attorney

E. H. JOHNSON.
EGG BEATER.
APPLICATION FILED SEPT. 25, 1915.

1,250,889.

Patented Dec. 18, 1917.
2 SHEETS—SHEET 2.

Witnesses

Inventor
E. H. Johnson,
By James N. Bevan
Attorney

UNITED STATES PATENT OFFICE.

EDWARD H. JOHNSON, OF BINGHAMTON, NEW YORK.

EGG-BEATER.

1,250,889.  Specification of Letters Patent.  Patented Dec. 18, 1917.

Application filed September 25, 1915. Serial No. 52,549.

*To all whom it may concern:*

Be it known that I, EDWARD H. JOHNSON, a citizen of the United States, residing at Binghamton, in the county of Broome and State of New York, have invented a new and useful Egg-Beater, of which the following is a specification.

This invention relates to improvements in implements for beating eggs or mixing of ingredients, and the object is to so construct such an implement as to materially simplify its manufacture and thereby reduce the cost of production and at the same time produce an article which will quickly and effectually accomplish the operation of either beating eggs or mixing various ingredients.

Figure 1:
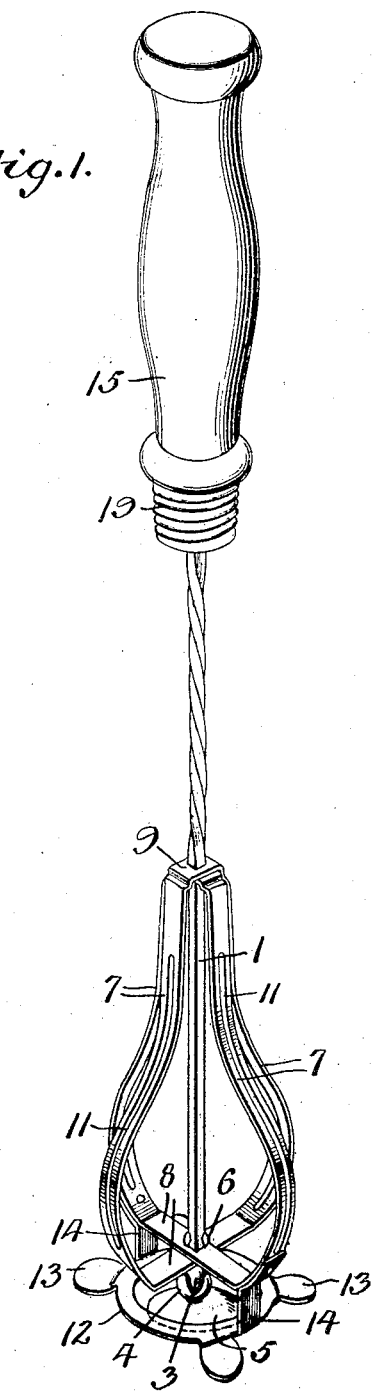
Figure 2:
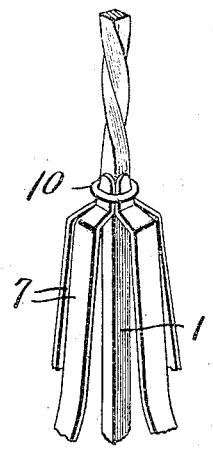
Figure 2:
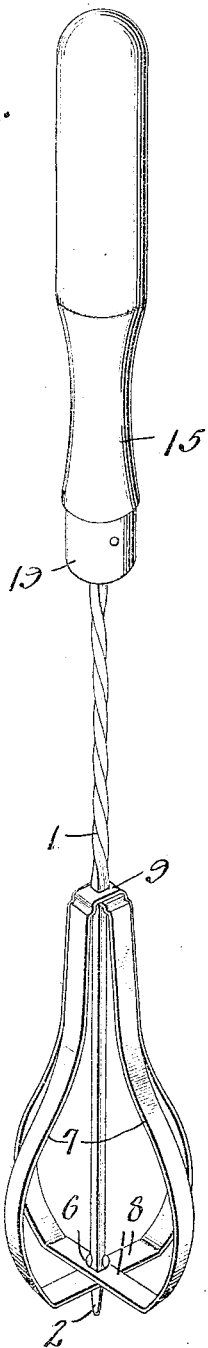
Figure 3:
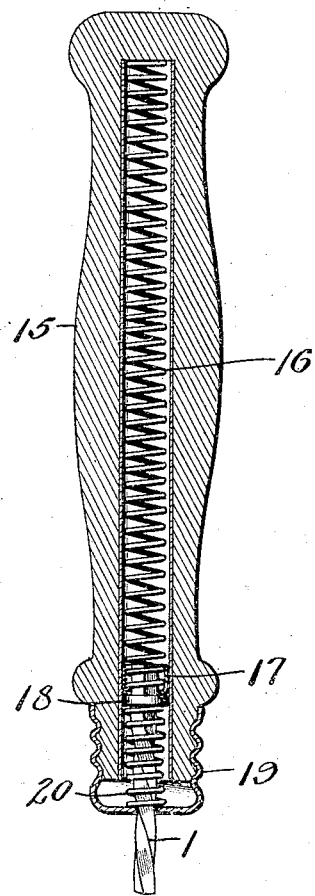

With the above object in view, the invention consists in the novel features of construction hereinafter fully described, particularly pointed out in the claims, and clearly illustrated by the accompanying drawings, in which Figure 1 is a perspective view of an implement constructed in accordance with my invention;

Fig. 2, a similar view of a modified structure;

Fig. 3, a sectional detail view showing the manner of attaching the ferrule to the handle of the beater shown in Fig. 1, and the arrangement of the spring in the handle which is the same in both structures, and Fig. 4, a detail view showing a modified arrangement for attaching the upper ends of the beater wings to the stem of the beater.

Referring now more particularly to the drawings, the stem 1, consists of a rod of such angular cross-section as to be adapted to form, when twisted, an effective spiral, said stem being shown to be of square cross-section, and to have a spiral portion which will be hereinafter more fully described. The lower end of said stem is reduced to form a projection 2. As shown in Fig. 1, a ball 3 is secured to said projection after the beater wings have been placed in position upon the stem 1. A base member is provided for supporting said ball comprising the sphere-like socket 4 and the disk 5 to which said socket is secured as shown.

The upper portion of said socket is so notched as to form a number of fingers adapted to inclose and loosely confine said ball, and the under side of said disk is concaved, so that it will rest securely upon the bottom of a dish or bowl which is raised at its center.

After the ball 3 has been secured to the projection 2, the socket 4 is applied thereto, and the fingers are so formed as to loosely confine said ball. In use, the concave side of the disk 5 rests upon the bottom of the mixing-vessel and the implement rotates thereon, thus holding the lower end of the implement in the desired position when used in a vessel the bottom of which is raised at its center.

Implements intended for use in mixing-vessels having a flat or concave bottom calculated to resist injury therefrom, may employ the modified construction shown in Fig. 2, in which the projection 2 forms a pivot upon which the implement may rest during rotation.

Each pair of wings 7 is formed of a single flat strip having a substantially straight portion 8 intermediate of the ends thereof, and provided with a central opening fitting the lower end of the stem 1. By upsetting the metal of said stem beneath said wings and the coöperation of the upset shoulders or lugs 6 formed in said stem above the portions 8, said wings are retained in position.

From their straight portions 8, the strips are curved to substantially U-shape so as to provide suitable beater-wings 7, having the ridges 11 formed therein to increase both their effectiveness and their rigidity, and the ends of said strips are bent abruptly toward the stem. In Figs. 1 and 2 the ends 9 of the wing-strips are shown as having openings, corresponding with the cross-section of the stem 1, through which said stem is inserted. In Fig. 4 the ends of the wing-strips are shown as tapering and being bent upwardly parallel to the stem 1, to which they are secured by means of the ring 10.

When beating eggs, with milk or other liquids, there is a tendency for the yolks to settle to the bottom of the mixing-vessel, and in using rotary beaters for this purpose difficulty is often experienced in breaking the yolks, as the ordinary action of beater-wings tends to cause the yolks to roll around on the bottom of the mixing-vessel without being brought into such contact with the beater-wings as to be broken by them. To avoid such action I provide a circulating and cutting member which depends below the beater-wings and carries a number of blades which, when rotated by the operation of the implement, tend to impart a vertical movement to the liquid surrounding them, and which are so shaped and arranged as to be adapted to break such yolks as are thus drawn into their path.

As shown in Fig. 1, the circulating and cutting member 12 consists of a ring-shaped body having a number of spaced blades 13 and two upwardly extending projections 14, said blades being inclined at a slight angle to the stem 1 so as to tend to impart a vertical movement to the liquid in which they are immersed when the implement is rotated, said projections being suitably secured to the beater-wings 7, as by riveting.

The recessed handle 15 contains the expelling or restoring spring 16 and the cushioning spring 20, said springs being wound in spirals having such an internal diameter that the stem 1 may pass freely therethrough.

The ring 18 is pressed on the stem 1 near the upper end thereof and at the commencement of the spiral, and thereby forms a flange or boss against which the springs 16 and 20 may suitably act. In the assembled implement, the spring 16 is placed above and the spring 20 is placed below the ring 18.

The lower end of the spring 16 is provided with a cup-shaped block 17, the internal diameter of the cup of said block being such as to fit snugly over the end of said spring, and the bottom of said cup being provided with an opening through which the stem 1 may freely pass. The use of this block prevents the end of the spring 19 from catching on the stem 1 or the ring 18.

The handle 15 is ordinarily made of wood, or other comparatively soft fiberous material, and is provided with the metallic lining 21 for the purpose of protecting the walls of the recess in said handle from the excessive wear which would result from the use of this implement if said recess was not thus lined.

The cap 19 is secured to the lower end of the handle 15, and the stem passes through an opening in the bottom of said cap and is operatively engaged thereby. In order to promote convenience in assembling, as well as to make the springs 16 and 20 readily accessible for purposes of adjustment or replacement, the lower end of the handle 15 and the side walls of the cap 19 should be screw-threaded in a direction opposite to the direction of the spiral on the stem 1, (see Figs. 1 and 3), but if considerations of cost predominate, said cap may be secured to the handle by means of indentations or of a pin, as indicated in Fig. 2.

From the foregoing it will be seen that each of the various features of this invention contributes toward the production of an egg beater which is simple, durable, economical to manufacture, and efficient and convenient to use, and it is believed that the manner of using this implement has hereinbefore been indicated with sufficient clearness to enable those skilled in this art to fully understand its operation without further description.

Having thus fully described my invention, what I claim as new and desire to secure by Letters Patent of the United States, is:

1. An implement of the character described, comprising vertical thrust actuating mechanism, a suitable stem rotatable thereby, a pair of beater-wings formed of a piece of metal bent to substantially U-shape with its central portion formed with an opening to fit on said stem and its ends secured to said stem above its lower end, the lower end of the stem being reduced to form a projection extending below the beater wings, and an auxiliary agitating member formed of a piece of metal having a plurality of rounded beater-projections and attaching-portions whereby it is secured to the wings.

2. An implement of the character described, comprising a stem and vertical thrust actuating mechanism therefor, a pair of beater-wings formed of a piece of metal bent to substantially U-shape having its central portion fitting on the lower end of the stem and its ends secured to the stem, the lower end of the stem being reduced to form a projection extending below the wings, a spherical member secured to said projection, a plate having a socket loosely confining said spherical member, and an auxiliary agitating member comprising a ring-like portion surrounding said spherical-member and socket and having a plurality of rounded beater-portions bent at an angle and attaching portions whereby it is secured to the lower portion of the beater wings.

3. An implement of the character described, comprising,—a revoluble stem, and beater-wings comprising strips each having an opening through which the lower end of said stem projects, the metal of said stem being upset above and below said openings, said strips being curved upwardly so as to surround a portion of said stem and to form suitable beater-wings, the ends of said strips being secured to said stem at a point intermediate of the ends thereof.

4. An implement of the character described, comprising,—a revoluble stem, beater-wings comprising strips each having an opening through which the lower end of said stem projects, the metal of said stem being upset above and below said openings, said strips being curved upwardly so as to surround a portion of said stem and to form suitable beater-wings, the ends of said strips being brought against and parallel to a portion of said stem at a point intermediate of the ends thereof, and a ring pressed on and inclosing said strip ends.

5. An implement of the character described comprising,— a revoluble stem, beater-wings comprising strips each having an opening through which the lower end of said stem projects, the metal of said stem being upset above and below said openings, said strips being curved upwardly so as to surround a portion of said stem and to form suitable beater-wings, the curved portions of said strips having ridges formed therein for the purposes described, the ends of said strips being brought against and parallel to said stem intermediate of the ends thereof, and a ring pressed on and inclosing said strip ends.

6. An implement of the character described comprising,—a revoluble stem, beater-wings secured to said stem near the lower end thereof, a projection extending below said beater-wings, and a member depending below said wings and having a plurality of blades formed integral therewith, said blades so projecting therefrom and being so formed and arranged as to be adapted, when rotated, to impart a vertical movement to surrounding liquid and to break the yolks of eggs suspended in such liquid.

7. An implement of the character described comprising,—a revoluble stem, beater-wings secured to said stem near the lower end thereof, a projection extending below said beater-wings, and a member depending below said wings and having a plurality of blades projecting therefrom, said blades being so formed and arranged as to be adapted, when rotated, to impart a vertical movement to surrounding liquid.

8. In an implement of the character described:—a revoluble stem, beater-wings secured to said stem near the lower end thereof, and a projection extending below said beater-wings; in combination with a circulating and cutting member having a ring-like body provided with projections and blades formed integral therewith, said projections extending upwardly and being suitably secured to said wings.

9. In an implement of the character described:—a revoluble stem, beater-wings secured to said stem near the lower end thereof, and a projection extending below said beater-wings; in combination with a circulating and cutting member having a ring-like body provided with projections and blades formed integral therewith, said projections extending upwardly and being suitably secured to said wings, and said blades being so shaped and arranged as to be adapted to draw toward them and cut portions of surrounding liquid or bodies suspended therein which may have a tendency to settle below the path of said beater-wings.

10. In an implement of the character described:—a stem, vertical thrust actuating mechanism therefor, and beater-wings secured to said stem near the lower end thereof; in combination with a ball-shaped member on said stem below said beater-wings, a sphere-like socket so notched as to form a number of fingers which inclose and loosely confine said ball, and a disk to the upper side of which said socket is secured.

11. In an implement of the character described:—a stem, vertical thrust actuating mechanism therefor, and beater-wings secured to said stem near the lower end thereof; in combination with a ball-shaped member on said stem below said beater-wings, a sphere-like socket so notched as to form a number of fingers which inclose and loosely confine said ball, and a disk to the upper side of which said socket is secured, the lower side of said disk being suitably concaved.

12. In an implement of the character described:—a stem, vertical thrust actuating mechanism therefor, and beater-wings secured to said stem near the lower end thereof; in combination with a ball-shaped member on said stem below said beater-wings, a sphere-like socket so notched as to form a number of fingers which inclose and loosely confine said ball, a disk to the upper side of which said socket is secured and the lower side of which is suitably concaved, a circulating and cutting member having a ring-like body surrounding said ball-and-socket structure and provided with projections and blades formed integral therewith, said projections extending upwardly and being suitably secured to said wings, said blades being so shaped and arranged as to be adapted to draw toward them and cut portions of surrounding liquid or bodies suspended therein which may have a tendency to settle below the path of said beater-wings.

In testimony whereof, I have signed my name to this specification, in the presence of two subscribing witnesses.

EDW. H. JOHNSON.

Witnesses:
 ED SHILLING,
 L. A. SHOVE.

Copies of this patent may be obtained for five cents each, by addressing the "Commissioner of Patents, Washington, D. C."